United States Patent [19]
Nolet

[11] Patent Number: 6,138,249
[45] Date of Patent: Oct. 24, 2000

[54] METHOD AND APPARATUS FOR MONITORING COMPUTER SYSTEMS DURING MANUFACTURING, TESTING AND IN THE FIELD

[75] Inventor: James F. Nolet, North Chelmsford, Mass.

[73] Assignee: EMC Corporation, Hopkinton, Mass.

[21] Appl. No.: 08/988,732

[22] Filed: Dec. 11, 1997

[51] Int. Cl.[7] .................................................. G06F 11/00
[52] U.S. Cl. .............................................. 714/25; 714/47
[58] Field of Search .............................. 714/25, 4, 8, 18, 714/52, 48, 49, 43, 57, 38, 47, 36, 30, 31, 6; 700/95, 96, 101, 102, 103, 108

[56] References Cited

U.S. PATENT DOCUMENTS

| | | | |
|---|---|---|---|
| 4,092,642 | 5/1978 | Green et al. | 340/527 |
| 4,477,873 | 10/1984 | McCarley | 710/18 |
| 4,750,175 | 6/1988 | Brenneman et al. | 714/712 |
| 4,914,572 | 4/1990 | Bitzinger et al. | 714/10 |
| 4,991,174 | 2/1991 | Mori et al. | 714/10 |
| 5,495,384 | 2/1996 | Wallis et al. | 361/64 |
| 5,535,330 | 7/1996 | Bell | 714/36 |
| 5,621,663 | 4/1997 | Skagerling | 714/47 |
| 5,673,386 | 9/1997 | Batra | 714/38 |
| 5,745,268 | 4/1998 | Eastvold | 714/26 |
| 5,777,549 | 7/1998 | Arrowsmith et al. | 714/25 |
| 5,802,146 | 9/1998 | Dulman | 379/34 |
| 5,901,280 | 5/1999 | Mizuno et al. | 365/189.11 |

*Primary Examiner*—Robert W. Beausoliel, Jr.
*Assistant Examiner*—Pierre E. Elisca
*Attorney, Agent, or Firm*—Wolf, Greenfield & Sacks, P.C.

[57] ABSTRACT

A method and apparatus for monitoring a plurality of data processing systems from a monitoring system. The data processing systems may be coupled to the monitoring system via a network cloud. When one of the plurality of data processing systems experiences a failure, the failure is detected at the monitoring system based upon communications over the network. The data processing systems may each have a service processor directly coupled to the network cloud. The monitoring system can also be employed to monitor the status of the data processing systems, either in a manufacture/test environment or in the field. The monitored status can include an inventory of parts for the data processing systems. Each part can be provided with identification information that is readable by the data processing system when the part is installed, and the identification information can be used to automatically generate an inventory of parts for each of the data processing systems. The monitoring system can also be used to automatically download an updated a piece of software to the data processing systems. In one aspect of the invention, bidirectional communication is employed between the monitoring system and the data processing systems. When an event occurs on the data processing system, the system sends a service request to the monitoring system notifying it of the event. The monitoring system also sends periodic communications to the data processing systems to ensure that each is functioning properly.

73 Claims, 7 Drawing Sheets

METHOD AND APPARATUS FOR MONITORING COMPUTER SYSTEMS DURING MANUFACTURING, TESTING AND IN THE FIELD

FIELD OF THE INVENTION

The present invention is directed to the field of manufacturing, testing and field service for computer systems.

DISCUSSION OF THE RELATED ART

The manufacture and testing of a computer or data processing system is a complex matter, particularly when a large number of systems are being manufactured and tested simultaneously. As used herein, the term computer system or data processing system includes not only general purpose computers, but also other types of computer-related systems that include some data processing capabilities. Computer systems typically include many components that are integrated together to form a complete system. An example of such a computer system is a storage subsystem that includes a plurality of disc drives, such as the SYMMETRIX line of disc arrays available from EMC Corporation, Hopkinton, Mass. Such a storage subsystem includes a large number of disc drives, power supplies and electronic boards that control operation of the storage subsystem. The manufacture and testing of the storage subsystem is typically a three step process. First, each of the components or subassemblies (e.g., the boards, drives and power supplies) is tested separately to ensure that they function properly. Next, components that pass the subassembly test are integrated together to form completed systems. Finally, system level testing is performed to ensure that each system functions properly and is ready to be shipped to a customer.

The goals of an effective manufacturing and test procedure are many. Obviously, it is desired to have a comprehensive set of tests run at both the subassembly and system test levels to detect any failures so that they can be addressed prior to shipping the system to the customer. At the system level, these tests typically involve the execution of application-level programs that are designed to test all functional aspects of the system. Such application-level programs are executed while the system is subjected to numerous environmental conditions (e.g., heat, cold, vibration, etc.). Software is typically employed to extract information about the execution of the application level programs and to record any system failures. When a failure occurs during the manufacture/test process, the failure is resolved or dispositioned. Depending upon the severity of the failure, it can be addressed by various individuals in the design/manufacturing operation. For example, simple errors may be dispositioned by a technician, with more complex errors being addressed by a test engineer, and others requiring involvement by the system's design engineers. It should be appreciated that it is desirable to have each error dispositioned at the lowest level necessary, such that design engineers are not called in to address problems that could be more properly handled by a technician. Thus, typical manufacture/test procedures develop a protocol so that each failure can be dispositioned at the lowest level possible.

When a failure occurs during the test process, it is desirable to maintain a record of how the failure was dispositioned. This can be particularly important in the event that a system fails in the field. One goal of the manufacture/test process is to ensure that all errors are detected before the system is shipped to the customer. Thus, if a system fails in the field, it is desirable to determine why the testing process did not detect the error prior to shipping, and to adapt the process so that it can detect similar failures in the future. The maintenance of records indicating the manner in which all errors on a particular system were dispositioned can be extremely helpful in determining why a particular failure in the field was not detected during the manufacture/test process.

It should be appreciated that system level testing for a complex data processing system can be time consuming, often taking several weeks per system. It is desirable to minimize this time as much as possible. The components that make up a complete system can represent a significant capital expenditure in inventory. Thus, it is desirable to reduce the amount of time that the inventory is tied up prior to shipment to the customer.

It should also be appreciated that at any given time, a large number of systems can be at different stages in the manufacture/test process. Thus, it is desirable for a manufacture/test procedure to facilitate easy tracking so that it can be determined at precisely what stage each system is in the manufacture/test process.

Conventional manufacture/test procedures have typically involved the use of a number of technicians to manually monitor the systems in a test facility to determine where each system is in the test process, and to determine when errors occur that need to be dispositioned. Each system is monitored by the technicians simply taking papers notes. This procedure is cost intensive in that a number of individuals are necessary to monitor a large manufacture/test facility. In addition, such a procedure is not conducive to sharing information amongst test groups. For example, if a particular subsystem caused a failure during system test, that information is conventionally not easily accessible to those individuals in the group responsible for testing that particular subassembly, thereby making it difficult to adapt the subassembly test to detect failures of that type in the future.

In more recent advances, paper notes have been replaced by the test technicians recording the status of each system and its failures on a floppy disc. The information can then be placed onto a central computer to make it accessible to other members of the test organization. However, this procedure still suffers from a number of the same disadvantages as the paper based system. In particular, a number of individuals are required to manually walk the test floor to check the status of each system under test. In addition, the storage and maintenance of the test information is problematic, as the floppy discs can consume a large volume of physical storage space and are susceptible to viruses that can destroy the data.

More recently, the assignee of the present application has employed an electronic monitoring technique to monitor its manufacture/test process for the SYMMETRIX line of storage subsystems. This technique is similar in some respects to a "call home" technique that has been employed to address errors in the field with the SYMMETRIX line of storage subsystems. The call home technique involves the self-detection by a SYMMETRIX in the field that it is experiencing problems, and a notification being automatically transmitted to a customer service center. As will be appreciated by those skilled in the art, a SYMMETRIX storage subsystem, like many other computer or data processing systems, includes a service processor that can be used to control the operation of the system. In association with the call home feature, the service processor detects when a problem is being experienced by the system, and utilizes a modem attached thereto to dial into the customer service center. The call from the field either identifies the type of problem being experienced by the system, or the nature of the problem can be identified by a technician at the customer service center who remotely accesses the system. The problem can then, if possible, be addressed remotely, or a customer service representative can be dispatched to address the problem in the field, often before the customer is even aware that any problem has been experienced.

The technique employed in the manufacture/test environment is similar in that a modem is employed to electronically couple the systems under test to a central monitoring computer system, so that the status of all of the systems under test can be monitored from the central computer. However, a modification is made in that the systems under test are not required to call home when they experience a test failure. The reason for this modification is that if any of the systems has an error or failure that is too significant, the system may not have the ability to "call home" to the monitor system. Thus, a polling technique has been employed so that the central monitoring system polls through each of the systems in the manufacture/test operation to collect information regarding their status and the failures experienced by each system under test.

This prior art polling technique is shown schematically in FIG. 1. A plurality of systems 1, 3 under test are shown. The number of systems can be any number that is possible and/or convenient to put through the manufacture/test process at any particular time. The central monitor system 5 includes a plurality of polling machines 7, 9 (labeled in FIG. 1 as PM1–PMX). The selection of the optimum number of polling machines is a balance between competing factors. The use of a single polling machine to monitor all of the relevant information from each of the systems 1, 3 under test would provide a relatively simple monitor system 5. However, the fewer the number of polling machines, and the more information that each polling machine is responsible for collecting, the longer it will take for a polling machine to complete a polling cycle through all of the systems 1, 3 under test.

The polling machines monitor the operation of the systems under test by checking the date and time stamps on particular files, and when a change has occurred since the last time the file was polled, the updated information is transmitted to the central monitor system 5, where it is stored in a manner discussed below. If a polling cycle is too long, it is possible that a change in data may occur in a particular test system that would be overwritten before the polling machine had a chance to collect the relevant information. Therefore, it is desirable to configure the monitor system 5 so that each polling cycle is sufficiently short in relation to the rate at which data is updated in the systems under test to minimize the chance that relevant information will go undetected.

To address the foregoing concerns, multiple polling machines have been employed. As shown in FIG. 1, each of the polling machines PM1–PMX is connected to each of the systems 1, 3 under test. Each polling machine is responsible for sampling only a subset of the information to be gathered. In one implementation, three polling machines have been employed, each sampling different files in the systems under test.

When relevant information from any of the systems 1, 3 under test is updated, the information is transferred, via a modem/telephone line connection 11–14, from the test system to the relevant polling machine. As discussed above, most computer or data processing systems employ a service processor. For example, the SYMMETRIX line of storage systems employs a lap top computer as the service processor. The service processor can be used to communicate with the polling machines over the modem/telephone line connection. Each of the polling machines is further coupled to a database 17, so that the information that the polling machines collect relating to the status of the systems under test is stored in a central database associated with the monitor system 5. Thus, the relevant information regarding all of systems 1, 3 under test can be monitored by examining the database in the central monitor system 5. The database is stored in a storage system (e.g., from the SYMMETRIX line of storage systems) to overcome the above-described problems inherent in the use of floppy discs.

The polling machines can be implemented in a straight forward manner using any type of computer (e.g., a PC). Each polling machine stores a list of the systems 1, 3 that it is responsible for polling, as well as the telephone numbers of their modems. Each polling machine simply steps through its list, and has certain files that it is responsible for checking. If the date and time stamp for the last update of the file has changed since the last time it was polled, the relevant information from the file is read by the polling machine and then transferred to the database.

As should be appreciated from the foregoing, if one of the polling machines experiences a problem, it could result in some relevant test information not being passed to the database 17, and being lost from the monitor system 5. This is particularly significant if only a single polling machine is employed to monitor a particular file within any of the systems 1, 3 under test, because there is no fault tolerance in such an implementation of the monitor system 5. To address this concern, the central monitor system 5 includes an event monitor 19 that is coupled to (e.g., via a network within the monitoring system 5) and monitors the status of each of the polling machines PM1–PMX to ensure that they continue to operate properly. The event monitor can be implemented in a straight forward fashion by a processor (e.g., a PC) that simply pings each of the polling machines. For example, when the polling machines are implemented by a PC running the windows NT operating system, the event monitor 19 can simply monitor the windows NT system log to determine whether the polling machine is continuing to operate. Alternatively, a particular file that should be updated repeatedly can be monitored, and if it is not updated within a particular time period (e.g., 10 minutes), the event monitor determines that the polling machine is not operating properly. When a problem with one of the polling machines is encountered, the event monitor 19 sends an e-mail and a page to a system administrator who can respond to address the problem.

Although the manufacture/test procedure shown in FIG. 1 works well, it has some disadvantages. As discussed above, there is a risk inherent with the polling scheme implemented in FIG. 1 in that any file updated multiple times during one polling cycle results in some data be missed by the monitor system 5 and lost forever. Furthermore, fault tolerance and reliability are a concern. In particular, the modem connections that implement the electronic links between the central monitor system 5 and the systems 1, 3 under test are not as reliable as would be desired. In addition, as discussed above, a single point of failure may be encountered if there is a single polling machine that is solely responsible for monitoring any of the test data within one of the systems under test.

In view of the foregoing, it is an object of the present invention to provide an improved method and apparatus for monitoring the manufacture/test of computer or data processing systems.

Furthermore, as discussed above, although the call home technique for monitoring systems in the field works well, it suffers from some reliability disadvantages due to the fact that a system experiencing failures must place a call, over a modem/telephone line connection, to the customer service center. Thus, it is a further object of the present invention to provide an improved method and apparatus for providing customer service to computer or data processing systems in the field.

In addition, it is an object of the present invention to provide an improved method and apparatus for controlling inventory in the manufacture of a computer or data processing system.

SUMMARY OF THE INVENTION

One illustrative embodiment of the invention is directed to a method of monitoring a plurality of data processing systems from a monitoring system to determine when any of the data processing systems experiences a failure. The method comprises the steps of: (A) coupling the plurality of data processing systems to the monitoring system via a network cloud; and (B) when one of the plurality of data processing systems experiences a failure, detecting the failure at the monitoring system based upon communications over the network cloud between the one of the plurality of data processing systems and the monitoring system.

Another illustrative embodiment of the invention is directed to an apparatus comprising a network cloud; a plurality of data processing systems coupled to the network cloud; and a monitoring system, coupled to the network cloud, that monitors the plurality of data processing systems to determine when any of the data processing systems experiences a failure, wherein the monitoring system detects a failure in one of the data processing systems based upon communications over the network cloud between the one of the plurality of data processing systems and the monitoring system.

A further illustrative embodiment of the invention is directed to an apparatus comprising a network cloud; and a data processing system having a service processor directly coupled to the network cloud.

Another illustrative embodiment of the invention is directed to a method of monitoring the status of a plurality of data processing systems from a monitoring system, the plurality of data processing systems being coupled to the monitoring system via a network cloud. The method comprises the steps of: (A) when the status of one of the plurality of data processing systems is updated, modifying a file within the one of the plurality of data processing systems to reflect the updated status; and (B) in response to the modification of the file in the one of the data processing systems, transmitting information reflecting the updated status of the one of the plurality of data processing systems over the network cloud from the one of the data processing systems to the monitoring system.

A further illustrative embodiment of the invention is directed to an apparatus comprising a network cloud; a plurality of data processing systems coupled to the network cloud, each one of the plurality of data processing systems having at least one file that represents a status of the one of the plurality of data processing systems; and a monitoring system, coupled to the network cloud, that monitors the status of the plurality of data processing systems. Each one of the plurality of data processing systems includes means, responsive to an update of the at least one file that represents the status of the one of the plurality of data processing systems, for transmitting information reflecting the update to the at least one file over the network cloud to the monitoring system.

Another illustrative embodiment of the invention is directed to a method of monitoring an inventory of parts in a plurality of data processing systems. The method comprises the steps of: (A) providing each part with identification information that is readable by one of the plurality of data processing systems when the part is installed in the one of the plurality of data processing systems; and (B) using the identification information for the plurality of parts in each one of the data processing systems to automatically generate an inventory of parts for each of the plurality of data processing systems.

A further illustrative embodiment of the invention is directed to an apparatus, comprising a plurality of data processing systems; and a service center that is coupled to the plurality of data processing systems and provides at least one service to the plurality of data processing systems. Each one of the plurality of data processing systems includes request means for transmitting a service request to the service center requesting a check of whether a resource in the one of the plurality of data processing systems is up to date. The service center includes means, responsive to each service request, for transmitting information back to a requesting data processing system indicating whether the resource in the requesting data processing system is up to date.

Another illustrative embodiment of the invention is directed to a method of automatically downloading an updated a piece of software to a plurality of data processing systems, the plurality of data processing systems each being coupled to a service center. The method comprises the steps of: (A) providing the updated piece of software on the service center; (B) periodically receiving service requests from each of the plurality of data processing systems, each service request including information from which a determination can be made as to whether the data processing system that transmitted the request has a copy of the updated piece of software; (C) in response to the service requests, automatically determining which of the plurality of data processing systems do not have a copy of the updated piece of software by; and (D) automatically downloading a copy of the updated piece of software to the data processing systems that do not have a copy of the updated piece of software.

A further illustrative embodiment of the invention is directed to a method of using a monitoring system to monitor the status of a plurality of data processing systems in a manufacture/test facility. The method comprises the steps of: (A) executing a plurality of tests on each of the plurality of data processing systems to test the functional operation of the plurality of data processing systems, each one of the plurality of tests generating a failure when one of the plurality of data processing systems does not properly execute the one of the plurality of tests; (B) when a failing one of the plurality of data processing systems experiences a failure, storing information in the failing one of the plurality of data processing systems identifying a nature of the failure, and broadcasting a service request from the failing one of the plurality of data processing systems to the monitoring system, the service request indicating that the failure has occurred; and (C) storing information in the monitoring system to record the failure in response to information provided by the failing one of the plurality of data processing systems.

Another illustrative embodiment of the invention is directed to a method of using a monitoring system to monitor the status of a plurality of data processing systems in a manufacture/test facility. The method comprises steps of: (A) executing a plurality of tests on each of the plurality of data processing systems to test the functional operation of the plurality of data processing systems, each one of the plurality of tests generating a failure when one of the plurality of data processing systems does not properly execute the one of the plurality of tests; (B) periodically transmitting inquiries from the monitoring system to each of the plurality of data processing systems requesting information as to whether the one of the plurality of data processing systems has experienced a failure; and (C) when a failing one of the plurality of data processing systems experiences a failure, storing information in the failing one of the plurality of data processing systems identifying a nature of the failure, and responding to one of the periodic inquiries by transmitting the stored information that indicates the nature of the failure to the monitoring system.

DETAILED DESCRIPTION OF THE INVENTION

Figure 1:
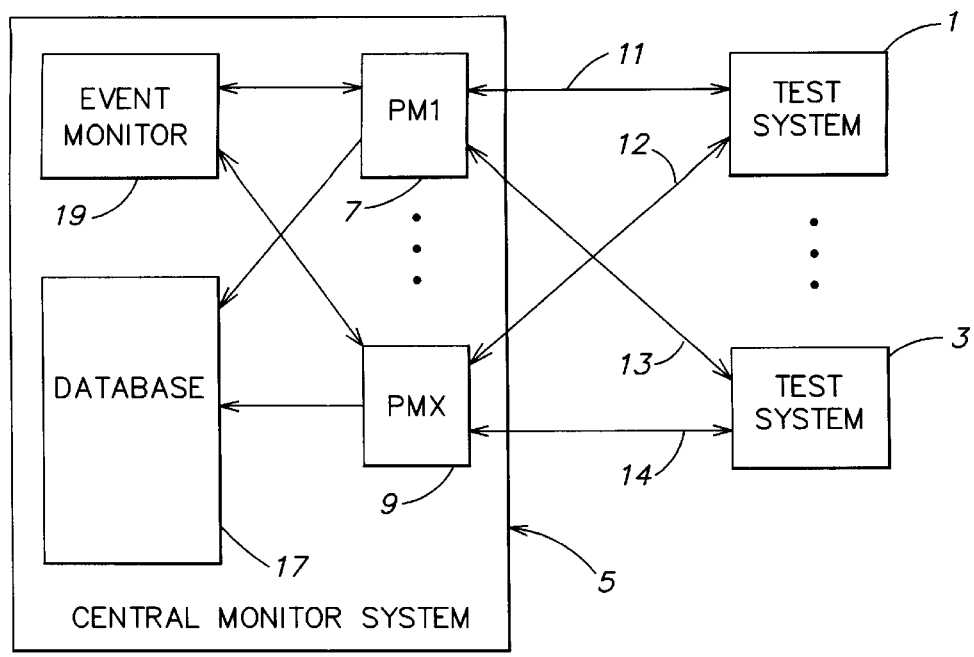
FIG. 1 is a block diagram of a prior art monitoring procedure that employs polling techniques to monitor a number of systems under test.
Figure 2:
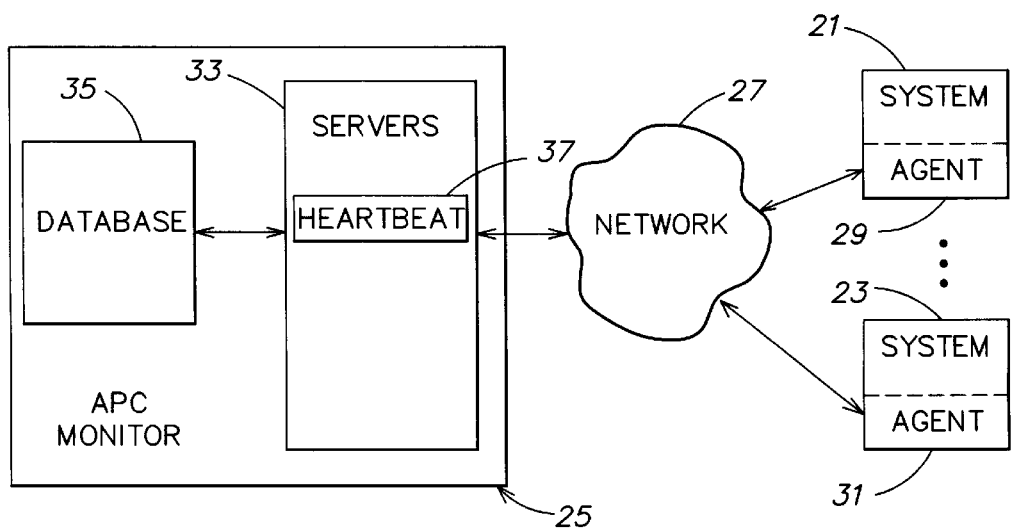
FIG. 2 is a block diagram of one embodiment of the invention that connects a monitoring system to a number of systems, either under test or in the field, via a network.

The disadvantages discussed above in connection with the prior art test monitoring procedure of FIG. 1 are addressed in one embodiment of the present invention shown in FIG. 2. In this embodiment of the invention, each of the systems 21–23 under test is connected, via a network 27, to a central monitoring system 25 labeled in FIG. 2 as an APC (adaptive process control) monitor. The network 27 can be of any type, and can include an intranet in a campus type environment, or can include the Internet. Thus, the systems under test 21, 23 share the network connection to the APC monitor, such that the network connection is not used exclusively for communication between the APC monitor and any one of the systems under test. By employing a network 27 to electronically couple the systems under test 21–23 to the APC monitor 25, the unreliability inherent in the use of modem and telephone line connections is overcome. Communication between the APC monitor 25 and each of the systems under test 21–23 is facilitated by assigning each of the test systems a particular name or address recognized by the network 27. As discussed more fully below, the monitoring system shown in FIG. 2 can be used to not only monitor systems during the manufacture/test process, but can also be used to monitor systems in the field. The APC monitor 25 includes a database 35 to store information concerning the systems being monitored.

In one embodiment of the invention, the database used during the manufacture/test monitoring process is also used to manage the inventory of the parts and subcomponents (collectively "parts") used in the systems under test. The database is automatically updated to maintain accurate information regarding the parts in each system under test. Although the loss of some test data due to the polling delay in the prior art procedure of FIG. 1 might be tolerated, the same is not true when the database is also employed for inventory management and control. For example, in accordance with one embodiment of the invention, if a technician were to swap out a power supply in test system 21 and replace it with another part, the monitoring system of FIG. 2 will detect this change. The swapping of parts is reflected in an update to a file on test system 21. If this transaction was not detected (e.g., due to delay in the polling time of the prior art monitor system of FIG. 1) the event would go unrecorded in the database, which would then be inaccurate for inventory control purposes.

To address the concern regarding inventory transactions or test file updates being missed as a result of the polling loop time in the prior art arrangement of FIG. 1, the embodiment of the invention shown in FIG. 2 employs a transaction-based procedure. In particular, each of the systems 21, 23 being monitored detects situations wherein information should be updated in the APC monitor 25, and notifies the monitor 25. This is similar to the call home feature discussed above, except that the notification is transmitted over the network 27, rather than a modem/telephone line connection. Each of the monitored systems 21, 23 has an associated agent 29, 31. Each agent 29, 31 monitors the relevant files of its associated system 21, 23, and when any of those files is updated, the agent performs two functions. First, the agent broadcasts a service request to the APC monitor 25 over the network 27, indicating that there has been a change of a relevant file that the APC monitor 25 should be aware of. Second, the agent stores or queues the updated information so that as the monitored system continues to operate, the queued information will not be lost if the relevant file is updated again, and will be available to the APC monitor 25 when it services the request. The queuing of the information by the agent ensures that no relevant information will be lost, even if there is a delay (e.g., due to the network 27 going down) in the APC monitor 25 servicing the broadcast request. The transaction based procedure is also advantageous in that it results in real time updates of the information in the APC monitor 25.

The APC monitor 25 includes at least one server 33 that is responsible for servicing the requests broadcast by the agents 29, 31 over the network 27. In a manner that is discussed in more detail below, the servers 33 handle the broadcast requests by reading the relevant information from the requesting agent 29, 31 over the network 27, and then updating the database 35 with the new information provided by the agent.

Relying upon the systems 21, 23 being monitored to notify (via their agents) the APC monitor 25 of status updates either during the test process or in the field presents a problem similar to that discussed above in connection with the "call home" procedure, i.e., if any of the systems 21, 23 experiences a problem significant enough to prevent the agent 29, 31 from making a broadcast over the network 27, information relating to that system could be lost. To address this concern, one embodiment of the present invention includes a special type of server 37 labeled as a heart beat server. The purpose of the heart beat server 37 is to poll each of the systems being monitored to ensure that each of the agents 29, 31 is continuing to operate. In this respect, the heart beat server 37 can simply ping each of the monitored systems in any of a number of manners to ensure that the system is still capable of communicating over the network 27.

It should be appreciated from the foregoing that the embodiment of the invention shown in FIG. 2 employs bidirectional communication between the systems 21, 23 being monitored and the APC monitor 25 to ensure that relevant information is not lost. Communication originating from the monitored systems is transaction based, in that each transaction generates a service request, ensuring that no transactions (e.g., a swap of components for inventory tracking or an update of test data) will be missed. The queuing feature ensures that information is not lost even if there is a delay in the APC monitor 25 servicing the request. Finally, the heart beat server 37 ensures that if any of the monitored systems 21, 23 experiences a problem rendering it incapable of sending a broadcast over the network 27, this problem is immediately recognized so that action can be taken to address the problem.

In accordance with the embodiment of the invention relating to inventory control, when each part is fabricated, it is provided with a part number and a serial number that are stored in a storage element (e.g., a memory chip) on the part. If a part is added, removed or replaced from a system under test or in the field, a file in the monitored system is updated to reflect the change. For example, for the illustrative example described above relating to a storage subsystem, there can be a file that includes the part type and serial numbers for every disc drive in the system. The updating of the file on the monitored system 21, 23 triggers the broadcasting of a service request to the APC monitor 25, which then updates its database 35 to reflect the change for inventory tracking purposes.

The servers 33 can be implemented by a single device that includes each of the services necessary to service broadcast requests from the agents 29, 31, or multiple servers can be employed. Each server can be implemented in any of a number of ways. For example, each server can be implemented via a PC capable of communicating over network 27.

Figure 3:
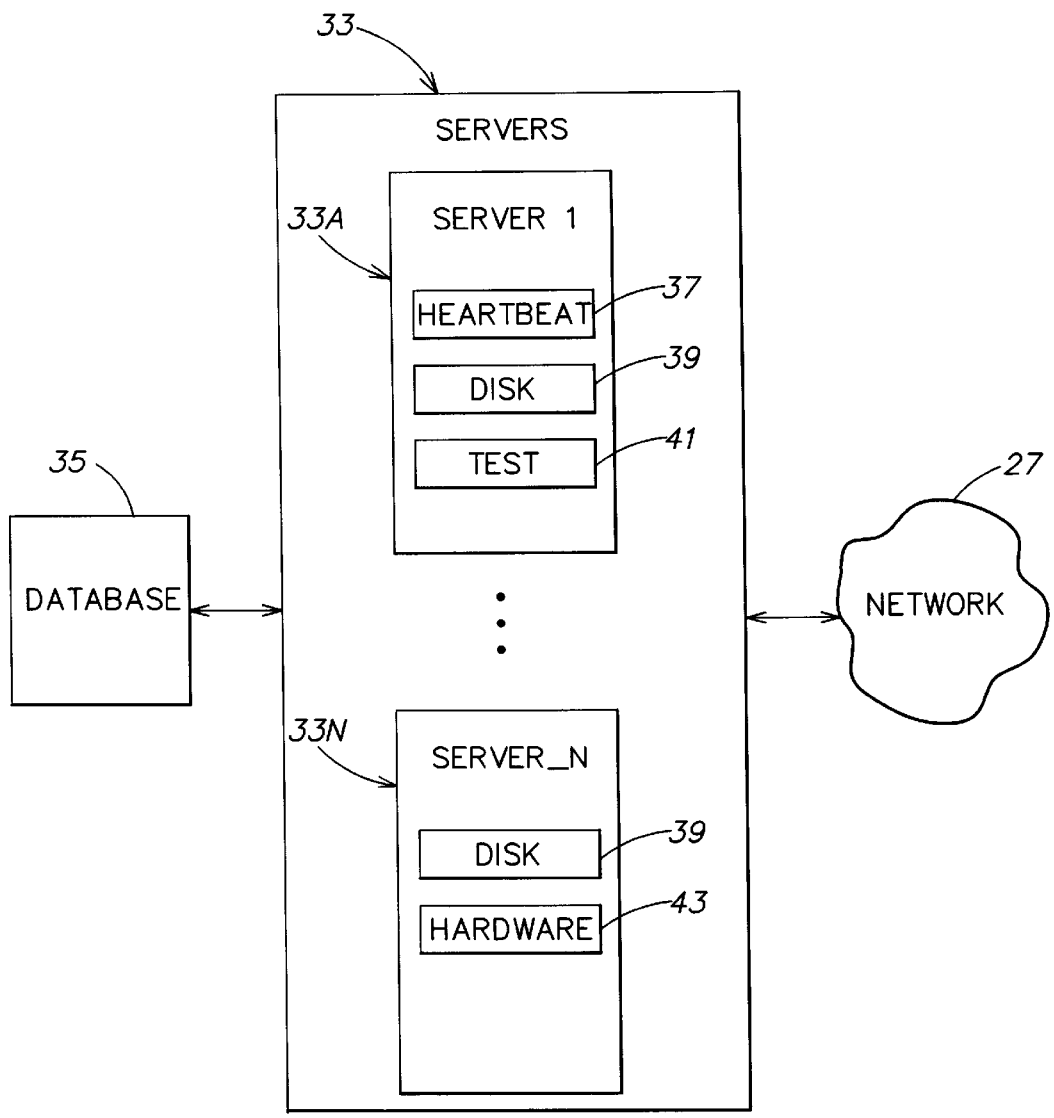
FIG. 3 illustrates one exemplary implementation of a plurality of servers employed in the monitoring system of FIG. 2.

In one embodiment of the invention shown in FIG. 3, multiple servers are provided for fault tolerance reasons. In FIG. 3, a plurality of servers 33A–33N is provided. Each of the servers includes at least one service. The services that respond to service requests broadcast over the network 27 by the agents 29, 31 (FIG. 2) can each be implemented simply as a program, run on a PC or other device that implements the server, that is idle and awaits an appropriate broadcast request to initiate the program. There are many different types of services that can be implemented, with the specific types of services employed being dependent upon the nature of the systems 21, 23 being monitored. One example of a service is the heart beat service 37 discussed above in connection with FIG. 2. In addition, for the illustrative embodiment described above wherein the monitored systems are storage subsystems that include a plurality of disc drives, another type of service can include a disc service 39 that includes information relating to the disc drives in the monitored system. Other examples include a test service 41 that includes information relating to factors such as environmental testing, and a hardware service 43 that includes information relating to the other hardware in the systems being monitored.

It should be appreciated that each service need only be implemented on a single one of the servers 33A–33N. However, in one embodiment of the present invention, each service is implemented on at least two of the servers. For example, the disc service 39 shown in FIG. 3 is implemented on both server 33A and server 33N. When each service is implemented on at least two servers, the fault tolerance of the system is improved because there is no single point of failure that would cause the APC monitor 25 (FIG. 2) to stop collecting information from the systems under test. In addition, implementing the same service on multiple servers enables multiple servers to respond to the same type of service request. This is advantageous because multiple agents 29, 31 associated with the monitored systems are capable of sending the same type of service request simultaneously. Having multiple servers available to respond to the same type of request enables multiple service requests of the same type to be processed simultaneously. It should be appreciated that there is tremendous flexibility in the manner in which the services can be distributed amongst the servers 33A–33N, such that any number of services can be implemented on any of the servers.

In the embodiment of the present invention wherein multiple ones of the servers 33A–33N implement the same service, a protocol is employed to determine which of those servers will handle each service request. As discussed in more detail below, in one embodiment of the invention, each of the servers responds to a service request with some information concerning the server, and the agent that broadcasted the request uses that information to select which server will handle the request. It should be appreciated that the present invention is not limited in this respect, and that numerous other protocols can be employed.

Figure 4:
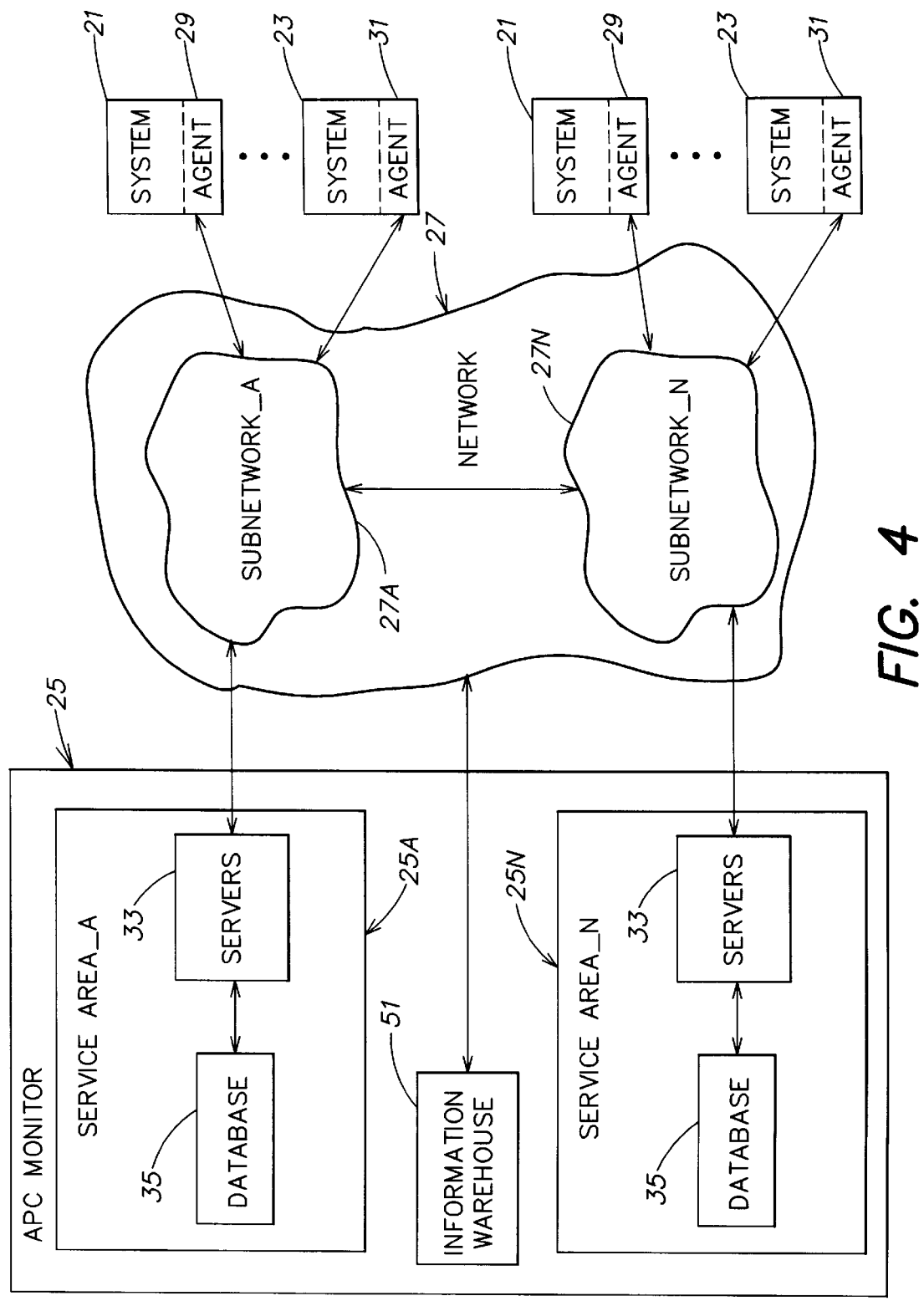
FIG. 4 illustrates the embodiment of the invention shown in FIG. 3, wherein the network is subdivided into a plurality of subnetworks and the monitoring system is subdivided into a plurality of service areas.

A large manufacture/test operation may include multiple facilities, some located great distances from each other and perhaps in different countries. The present invention is flexible enough to be employed within a single manufacture/test facility, and to also network together different facilities, even if they are separated by great distances. Similarly, when monitoring systems in the field, the present invention enables a plurality of different customer service centers to be networked together. FIG. 4 illustrates one implementation of a system employing the aspects of the present invention discussed above in connection with FIG. 3 to link together two facilities which may be disposed at remote locations. It should be appreciated that similar techniques can be employed to network together different areas in a single facility.

Networks typically include a plurality of subnetworks that each interconnects a plurality of devices. Such an arrangement is shown in FIG. 4, wherein the network 27 is shown as split into a plurality of subnetworks 27A–27N. In the embodiment shown in FIG. 4, the APC monitor 25 is subdivided into a plurality of service areas 25A–25N, each corresponding to one of the subnetworks 27A–27N. Each of the service areas 25A–25N includes one or more servers 33 and a database 35 that operate together in the manner described above to service requests from the agents 29, 31 associated with those monitored systems 21, 23 that are coupled to the corresponding subnetwork. The databases 35 within each of the plurality of service areas can be consolidated via an information warehouse 51, so that all of the information stored within the multiple service areas is accessible from a central location. The information warehouse can be implemented in any manner, and the present invention is not limited to any particular implementation. As will be appreciated by those skilled in the art, an information warehouse is typically implemented by replicating the information stored in each of the databases 35 in a single storage system to form the information warehouse.

The embodiment of the invention shown in FIG. 4 can be implemented in a number of different ways. For example, the service requests for each of the agents 29, 31 can be serviced solely by the servers 33 in the one of the service areas 25A–25N that is coupled to the same subnetwork. In this respect, if a request is not serviced within a predetermined period of time, the requesting agent can simply retransmit the request over the subnetwork. Alternatively, the system can be implemented so that although initial preference is given to servicing all requests locally within its particular subnetwork, when a service request goes unanswered, the requesting agent can rebroadcast the request globally over network 27 to other service areas 25A–25N. As discussed above, the different service areas can be located within one facility, or can be remotely located at great distances from each other.

Figure 5:
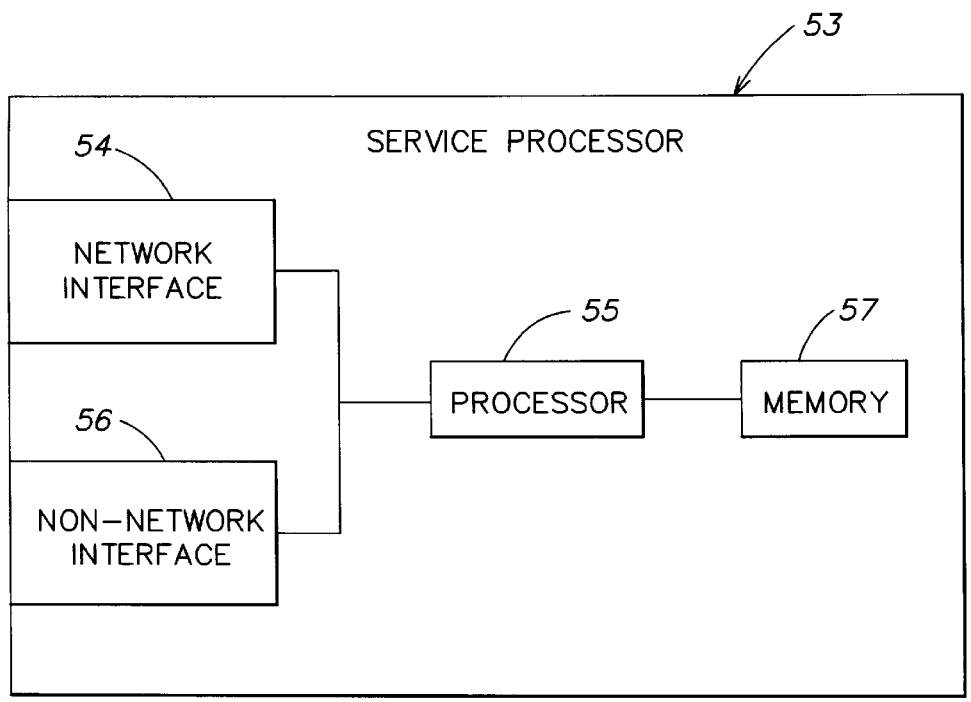
FIG. 5 is a block diagram of a service processor in the computer systems monitored in accordance with the present invention.

One advantageous feature of the embodiments of the present invention shown in FIGS. 2–4 is that they require very little support in terms of changes to the systems 21, 23 being monitored. In particular, most computer or data processing systems employ some processing hardware that can be used to implement the agent 29, 31, so that no hardware support need be added to the data processing system. As discussed above, in the illustrative embodiment wherein the systems being monitored are storage subsystems, these systems typically include a service processor implemented by a PC. A block diagram of such a service processor is shown in FIG. 5. The service processor 53 includes a processor 55 on which software programs can be executed and a memory 57 in which the software can be stored. The agent can be implemented in software that is stored in the memory 57 and executed on the processor 55. As shown in FIG. 5, the service processor 53 conventionally includes a network interface 54 (e.g., an Ethernet port) that enables the processor 55 to communicate with a network cloud, as well as a non-network interface 56 (e.g., a SCSI port) that enables the processor 55 to communicate with the data processing system. For example, the non-network interface may be coupled to a backplane in the data processing system. As used herein, the term network interface is used to define an interface capable of communicating with a network cloud over which communication is performed using a network protocol, so that information transferred through the cloud includes a destination address to enable the information to be transported by the cloud to the appropriate destination.

It should be appreciated that although the service processor provides a convenient platform on which to implement the agent, the present invention is not limited in this respect, because the agent can be implemented in other ways. For example, the data processing system may include other processing hardware that has access to a network interface and can serve as the agent. If the system 21, 23 (FIG. 3) being monitored is a PC or other general purpose computer, the agent can simply be implemented in software that executes on the general purpose computer. Alternatively, the agent can be implemented in the special purpose hardware implemented either on the system being monitored, or in an associated device that is coupled thereto.

Figure 6A:
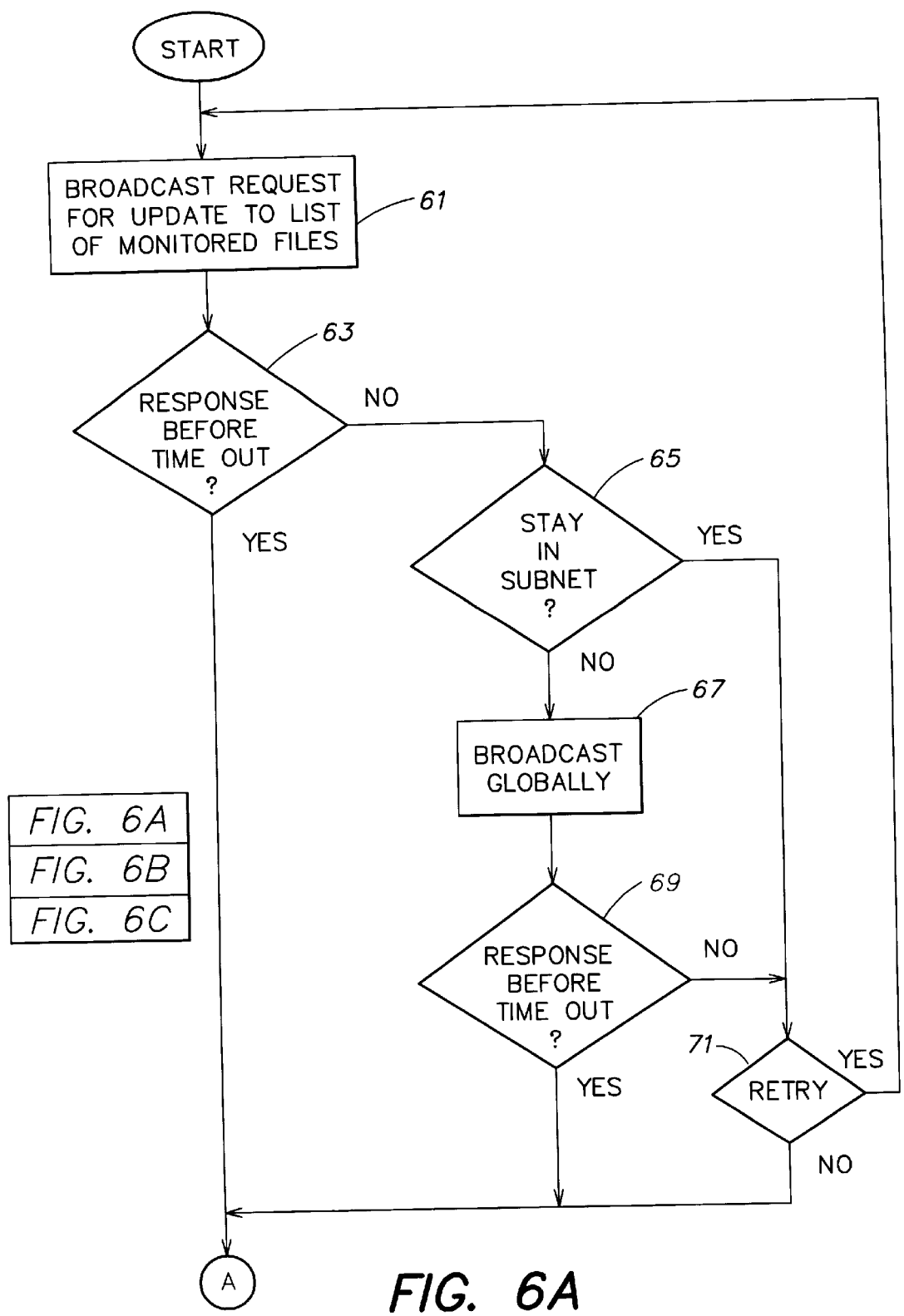
FIGS. 6a, 6b and 6c are a flow chart of a program that implements an agent on the systems being monitored in accordance with the embodiments of the invention shown in FIGS. 2–5.
Figure 6B:
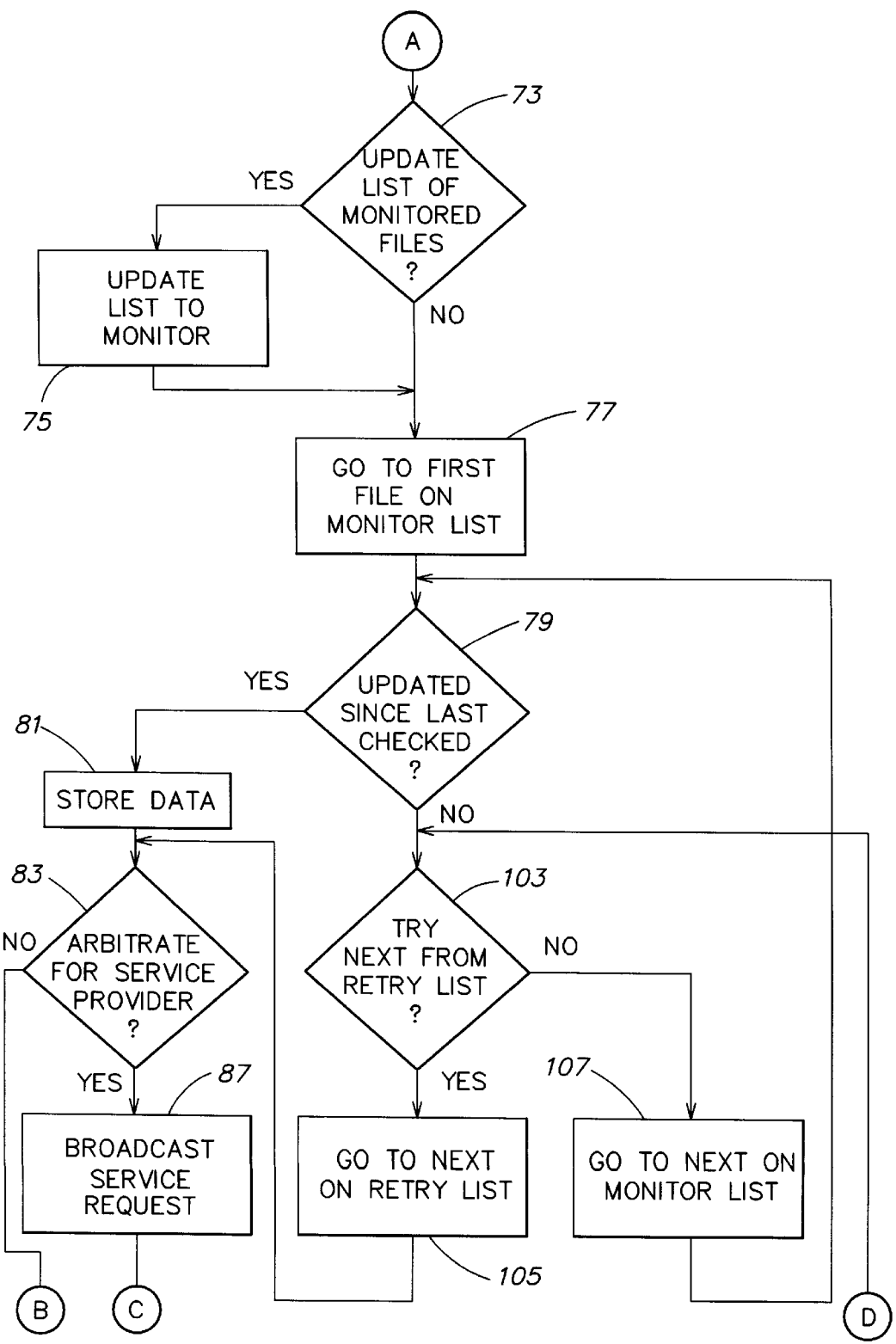
Figure 6C:
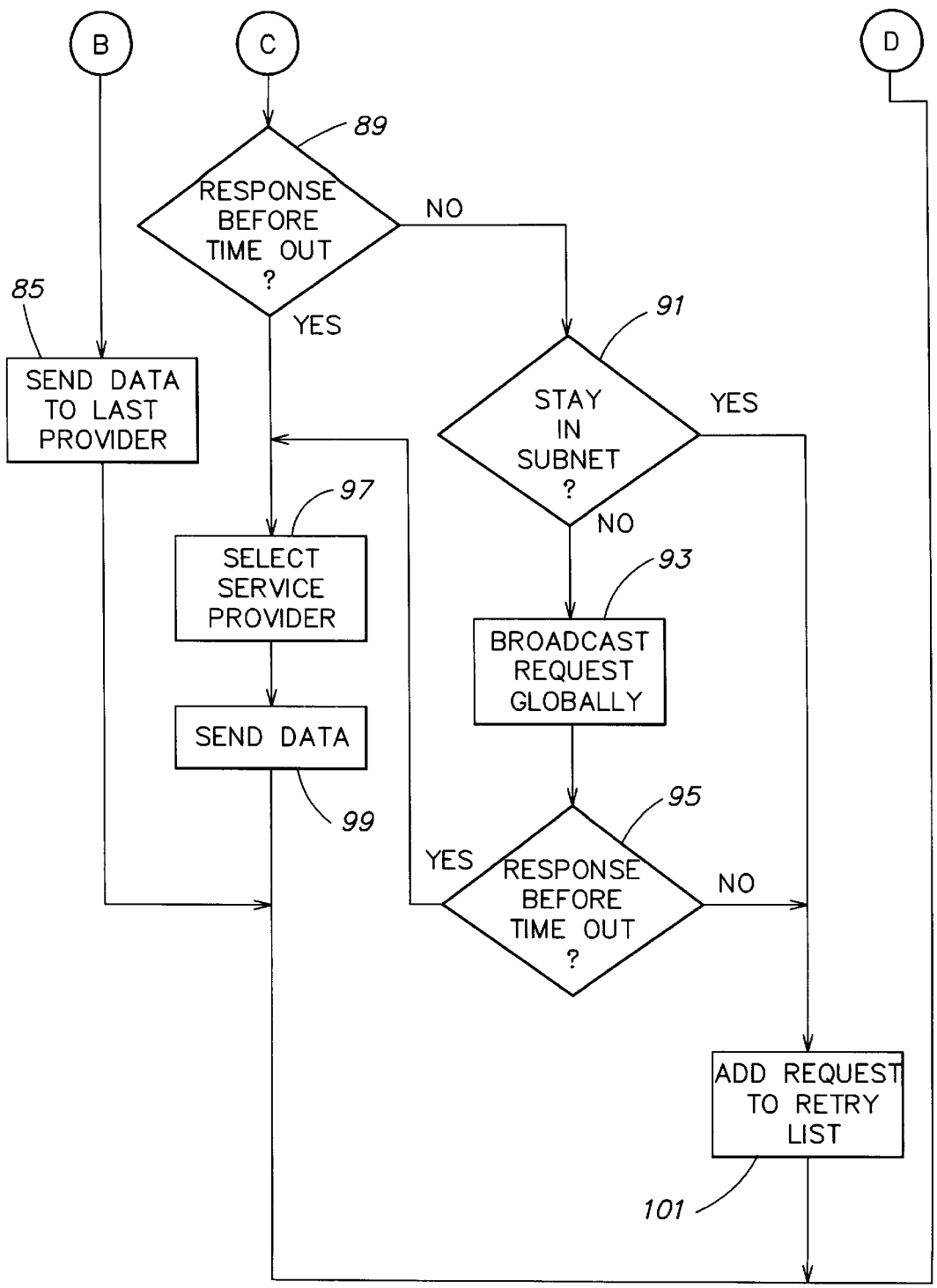

An illustrative flowchart for a software program to implement the agent 29, 31 is shown in FIG. 6. It should be appreciated that the present invention is not limited to this particular implementation, as numerous others are possible.

In the illustrative embodiment of the invention shown in FIG. 6, the system is provided with the advantageous capability of enabling the particular files monitored by the agent 29, 31 in each system to be updated or controlled by the APC monitor 25. The agent can be initialized with a default set of files to monitor, but this list can be altered by the APC monitor 25. Thus, modifications to the monitored systems, either in the manufacture/test environment or in the field, can be made automatically by simply updating the database 35 in the APC monitor, without requiring manual updates to each system. Although this automatic reconfiguration provides the advantages described above, it should be appreciated that the invention is not limited in this respect, and that the agents can simply monitor files according to a list initially stored therein, without checking for updates from the APC monitor.

Upon powering up of the processor on which the agent is implemented, the agent program begins. Initially, in step 61, the agent broadcasts a service request to determine whether any updates should be made to its list of files to be monitored. A service is implemented on at least one of the servers 33A–33N (FIG. 3) to handle this service request in the manner discussed above. In step 63, the program checks to determine whether a response from one of the servers is received before a time out condition occurs. If no response is received within this time period, the program proceeds to step 65, wherein a determination is made as to whether requests from the agent are to remain within a particular subnetwork, or should be broadcast more globally. If it is determined at step 65 that more global broadcasts over the network are to be made, the program proceeds to step 67, wherein the request is rebroadcast globally. Thereafter, the method proceeds to step 69, wherein a determination is made as to whether a response has been received before a time out condition has occurred.

When it is determined at step 65 that the program is to limit its broadcasts to the local subnetwork, or when it is determined at step 69 that no response was received to the global broadcast before a time out occurred, the program proceeds to step 71, wherein a determination is made as to whether the broadcast requesting updates to the list of monitored files should be retried. In this respect, the agent can be initialized to re-try the broadcast a number of times before simply proceeding with the list of monitored files with which it was initialized. When it is determined that the broadcast should be retried, the program returns to step 61.

When it is determined at either of steps 63 or 69 that a response to the broadcast was received, or when it is determined at step 71 that the broadcast should no longer be retried, the program proceeds to step 73, wherein a determination is made as to whether the initialized list of monitored files should be updated, and when it should, the program proceeds to step 75 to update the list based on the information returned by the server that responded to the broadcast request.

When it is determined at step 73 that the list of monitored files should not be updated, or after the list is updated at step 75, the program proceeds to step 77, wherein it begins to process the first file on the list of monitored files. The program then proceeds to step 79, wherein a determination is made as to whether the file being processed has been updated since the last time it was checked. When it has, the method proceeds to step 81, wherein the newly updated information is stored. As discussed above, this is advantageous because it ensures that no data will be lost in the event that there is a delay in one of the servers responding to the broadcast request.

The program next proceeds to step 83, wherein a determination is made as to whether to arbitrate to select a particular server to handle the service request for the updated file, or whether to simply employ a previously selected server. Although this determination is advantageous for the reasons discussed immediately below, it should be understood that the invention is not limited in this respect, and that the agent could simply arbitrate for a server each time a request is broadcast.

As discussed above, in one embodiment of the present invention, multiple servers 33A–33N (FIG. 3) can be provided with the capability of responding to a particular type of service request. Thus, when an agent broadcasts a service request over the network 27 (FIG. 2), multiple servers may respond indicating that they have the capability of servicing the request. The agent then selects between the responding servers to determine which will handle the request. This process is advantageous for fault tolerance reasons because multiple servers can handle each request. Furthermore, the agent can select the particular server that can handle the request most efficiently. However, it should be appreciated that this arbitration process requires some resources in terms of processing time and traffic over the network 27. Thus, in one embodiment of the invention, once an agent arbitrates to select a particular server to handle a specific type of service request, the agent will automatically send all future requests for the same type of service to that server for a predetermined period of time, rather than arbitrating separately for numerous service requests of the same type.

Consistent with the foregoing, at step 83, a determination is made as to whether to arbitrate for a new server. When it is determined that such arbitration should not take place, the program proceeds to step 85, wherein the relevant data for the service request is simply sent to the previously selected service provider.

When it is determined at step 83 that the agent should arbitrate for a new service provider, the program proceeds to step 87, wherein the service request is broadcast over the appropriate subnetwork (FIG. 4). At step 89, the program determines whether a response is received before a time out condition, and when one is not, the program proceeds to step 91, wherein a determination is made as to whether the service request should remain within the local subnetwork. When it is determined that the request should not remain within the local subnetwork, the program proceeds to step 93, wherein the service request is rebroadcast globally, and the program then proceeds to step 95 to determine whether a response is received before a time out condition. When it is determined at either of steps 89 or 95 that a response has been received from at least one of the servers before the time out condition, the program proceeds to step 97, wherein a service provider is selected from those that responded.

The service provider can be selected in step 97 in any of a number of ways, using either a very simple selection algorithm or a more complex one. For example, each server can be assigned a number that it can return in the message sent to the requesting agent, and the agent can simply select the highest or lowest number to select a particular service provider. However, in accordance with one embodiment of the invention, a more complex selection algorithm is employed in an attempt to increase the efficiency of the system. In particular, each of the servers 33A–33N (FIG. 3) that responds to a service request can calculate a cost associated with responding to the request. A number of factors can be considered in determining the cost of servicing a request, including a number of service requests that the server may have queued up, available memory in the server, etc. Each server can then respond to the requesting agent with its cost information, and the agent can select the responding server with the lowest cost to handle the request.

After a particular server is selected, the program proceeds to step 99, wherein the updated information associated with the service request is sent to the selected server from the queue in which it was stored in step 81. The information sent to the server can include the full updated file that was monitored by the agent, or some subset of information indicating what portion of the file has been changed.

When it is determined at step 91 that requests from the agent should remain in the local subnetwork, or when no response is received to the global rebroadcast in step 95, the program proceeds to step 101, wherein the service request is added to a list to be retried.

After the data is sent to a service provider in either of steps 85 and 99, or after the request is added to the retry list in step 101, the program proceeds to step 103, to determine whether one of the broadcast requests on the retry list should be rebroadcast. In this respect, as stated above, when a problem is encountered in getting a server to respond to a service request, there is no danger that the data will be lost, because it is stored in step 81. The illustrative program shown in FIGS. 6a–b will occasionally rebroadcast such requests. However, the program will not loop indefinitely through steps 83–103 attempting to retry any service request for which a response was not received. In this respect, the program places a priority on continually looping through the list of files to be monitored, to ensure that no updates are missed. Therefore, a decision will be made in step 103 only periodically to attempt to rebroadcast some of the service requests on the retry list. This determination can be based on the number of monitored files processed between service request retries, on a particular time period, or some other suitable criteria.

When it is determined at step 103 that one of the service requests on the retry list should be rebroadcast, the program proceeds to step 105 to go to the next service request on the retry list, and then returns to step 83. Alternatively, when it is determined at step 103 that the program should not rebroadcast one of the service commands on the retry list, the program proceeds to step 107, wherein it goes to the next file on the monitor list, and then returns to step 79.

As discussed above, the embodiments of the present invention discussed above are not limited to a manufacture/test environment, and can be used in connection with systems installed in the field. The APC monitor 25 (FIG. 2), or its service areas 25A–25N (FIG. 4), can be customer service centers located anywhere in the world, with access to remote field installations over a network 27 that can be implemented, for example, as a portion of an intranet or over the Internet. The customer service center can employ a heart beat service as discussed above to ensure that each of the systems in the field is functioning properly. Furthermore, each machine in the field can broadcast service requests when it experiences a problem that should be brought to the attention of customer service. It should be appreciated that this embodiment of the present invention has a number of advantages over the call home technique discussed above. First, the use of a modem-less connection (e.g., network 27)

to connect the systems in the field with the customer service center increases the reliability of the monitoring system. Second, the heartbeat service ensures that if a system in the field experiences a problem severe enough to inhibit it from sending a service request to the customer service center, this problem will be detected quickly, likely before the customer is aware of the problem.

It should be appreciated that with both customer installations in the field and the manufacture/test environment, systems may periodically be added to or removed from the monitoring system of the present invention. To facilitate this process, in one embodiment of the invention, each agent has the capability of sending two types of service requests, a first requesting registration so that the corresponding system is added to the monitoring system, and a second requesting that the system be removed from the monitoring system. The servers 33A–33N (FIG. 3) can include a service to handle these registration requests, so that changes to the list of registered systems can be reflected in the database and the list of monitored systems for the heart beat service.

As discussed above, in one embodiment of the present invention, when a relevant data file is updated in a system 21, 23 (FIG. 2) being monitored, this information is stored by the agent 29, 31 (FIG. 2) so that it is not lost. In the embodiment of the invention wherein the agent is implemented in the service processor of the monitored system, this information can simply be stored in the service processor. For example, when the service processor is implemented as a PC, the information can be stored in the hard drive associated with the PC. However, the invention is not limited in this respect, as the queued information can be stored in other locations, including on a dedicated storage device coupled to the agent. In one embodiment of the invention, the amount of storage provided to queue updated information awaiting service from the APC monitor 25 is configurable. If the amount of information to be stored exceeds the configured amount, one embodiment of the invention continues to write new information to the storage area, so that the oldest data will be lost first. However, when used in conjunction with the heart beat service discussed above, it is believed that many problems that would result in a failure of the updated information to be transferred from the monitored system to the APC monitor's database 35 (FIG. 2) should be detected quickly, so that significant amounts of data should not be lost.

Although the use of a network to couple together the APC monitor system 25 and the systems 21, 23 being monitored provides a number of advantages discussed above, it should be appreciated that the present invention is not limited in this respect, and that the communication protocol discussed above in connection with FIGS. 2–6 can alternatively be employed with different types of communication links being established being the APC monitor system 25 and the monitored systems. For example, modem and telephone line connections can be employed. Each time a service request is broadcast, the system being monitored can dial a designated telephone number for a server that can respond to the particular type of request. Similarly, the heartbeat service can dial into each of the systems being monitored to ensure that each is operating properly.

The aspects of the present invention directed to the monitoring of systems in the field are not limited to the implementation described above that employs transaction-based service requests issued from the agent associated with each system in the field, and the heart beat service executed on the customer service center. One alternate embodiment of the present invention employs polling by the customer service center that operates in much the same manner as the central monitor system 5 that was discussed above in connection with FIG. 1, and has previously been employed only in a manufacture/test facility. This polling technique provides an advantage over the call home technique discussed above for use in the field, in that the customer service center controls communication with the systems in the field, so that if a problem is encountered that would prevent a system from calling home, such a problem will be detected. This polling technique can be employed with a modem/telephone line connection between the systems in the field and the customer service center, or these systems can be connected via a network in the manner described above to increase reliability.

In another embodiment of the invention, the polling techniques of the prior art system of FIG. 1 are combined with the queuing of information by the systems being monitored to ensure that no data is lost as a result of the loop time inherent in a polling system. This aspect of the present invention can be used to monitor systems in the field, or in a manufacture/test environment. This embodiment of the invention can also be employed with a modem/telephone line connection between the monitored systems and the central monitor, or these connections can be accomplished via a network in the manner described above.

As discussed above, one advantageous feature of the embodiments of the present invention that generate a service request when a file is updated is that the monitoring system 25 and its database can also be employed for inventory control. As discussed above, in accordance with one embodiment of the invention, each component and subassembly is provided with a part number and a serial number that can be read via the agent associated with the monitored system 21, 23 (FIG. 2). Thus, when a component or subassembly is added or removed from one of the systems being monitored, an internal file is updated, resulting in a service request that causes the new component/subassembly information to be loaded into the database 35. It should be appreciated that this embodiment of the invention thereby enables inventory to be tracked automatically, such that the database 35 (FIG. 2) will store correct information regarding the inventory used in the monitored systems 21, 23, without requiring any manual updates to the database when components or subassemblies are added to or removed from one of the monitored systems. It should be appreciated that this inventory tracking is beneficial not only in a manufacture/test environment, but also for monitoring systems in the field. In particular, customers may from time to time trade in equipment when purchasing new systems. Thus, for inventory control purposes, it may also be useful to have the database 35 include information concerning all of the components and subassemblies in the systems in the field.

In the discussion above, one example provided of a computer or data processing system that can be monitored in accordance with the embodiments of the present invention is a storage subsystem. However, as discussed above, it should be appreciated that the present invention is not limited in this respect, and that the present invention can be employed to monitor computer or data processing systems of numerous other types, including general purpose computers and other systems that have some processing capabilities. In addition, it should be appreciated that the present invention can be used to monitor subassemblies of a complete system. For example, during the subassembly test process, the electronic boards that control the operation of a system such as a storage subsystem can be tested as a subassembly, and the status of the subassembly tests, and parts for inventory control, can be monitored using the embodiments of the present invention in the manner described above.

As described above, some types of data processing systems (e.g., CPUs and PCS) have conventionally been provided with a network interface that enables them to communicate with other devices over a network using a network protocol. When the above-described aspects of the present invention are used to monitor such systems, those systems can be coupled to the network in a conventional fashion using their network interfaces. However, other types of data processing systems have not conventionally been directly coupled to a network. Many types of data processing systems (e.g., storage subsystems) have only previously been connected to a network through a non-network interface that is coupled to another computer (e.g., a CPU), that in turn has a network interface capable of communicating using a network protocol. One aspect of the present invention is directed to a new architecture that directly couples such systems to a network. This architecture is advantageous for a number of applications in addition to the monitoring application discussed above.

Figure 7:
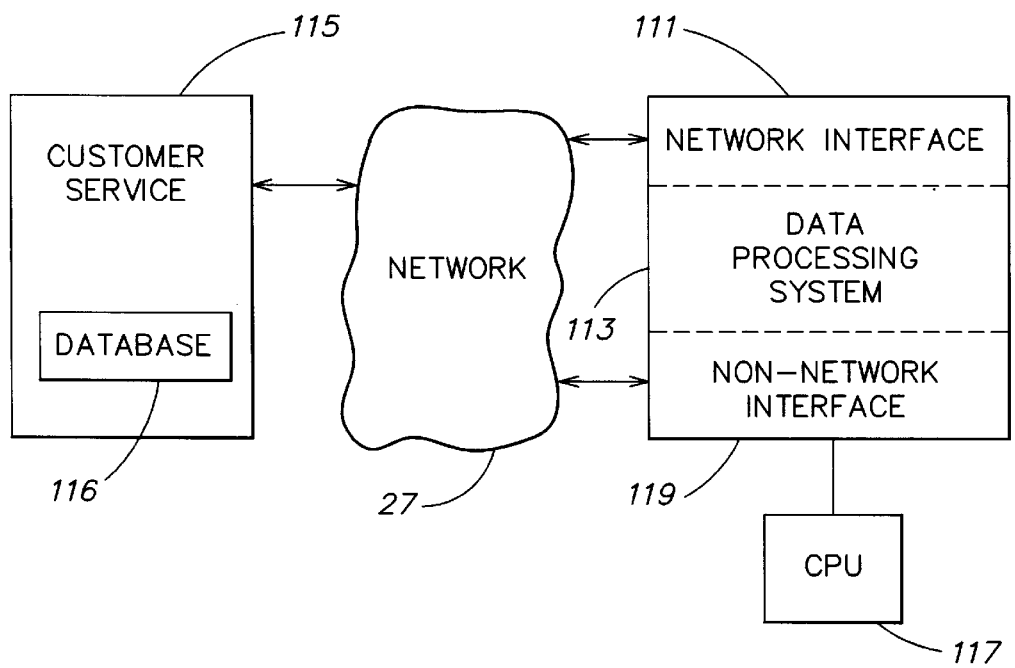
FIG. 7 illustrates a system architecture in accordance with another illustrative embodiment of the invention wherein the service processor of a data processing system is directly coupled to a network.

As discussed above, one embodiment of the present invention implements the agent in the service processor of the system 21, 23 (FIG. 2) being monitored, and couples the service processor directly to a network through a network interface provided on the service processor. Thus, the data processing system has a network interface (provided by the service processor) that is directly coupled to a network. The service processors for many types of data processing systems have not conventionally been directly coupled to a network. Rather, as mentioned above, many data processing systems that employ a service processor have only conventionally been coupled to a network through another computer. In accordance with one embodiment of the present invention, a different configuration is employed, as shown in FIG. 7. In this configuration, the data processing system 113 has a network interface 111 that is directly connected to a network 27. The network interface 111 may be provided by the service processor as described above, or a separate network interface can be provided that bypasses the service processor. As shown in FIG. 7, the data processing system 113 may also optionally have a conventional connection to the network 27 through a non-network interface 119 that is coupled to the network via a CPU 117.

The coupling of the data processing system 113 directly to the network 27 via its network interface 111 is a powerful new configuration, that enables the implementation of a number of useful applications in addition to the monitoring application described above.

In another embodiment of the invention, one such application involves communication between the APC monitor 25 (FIG. 2) and the plurality of monitored systems 21, 23 in a manufacture/test environment or in the field, that enables automatic updates to the monitored systems. For example, the connection of the network interface 111 of a data processing system 113 in the field to a customer service facility 115 as shown in FIG. 7 enables software updates to be made to the data processing system automatically. Although it is conventional to download software over a network such as the Internet, such downloads have not been done automatically, and have required manual intervention by a system operator. In accordance with one embodiment of the present invention, the agent for the data processing system 113 can automatically and periodically send to the customer service site 115, over the network 27, service requests that provide the revision numbers of certain software loaded on the data processing system, and query whether those revisions are up to date. In response to those service requests, the customer service center 115 can automatically download any new revisions of software to the data processing system 113. This downloading of software is entirely automatic, and does not require any manual intervention at the customer service center 115 or the data processing system 113. Once the new software is loaded into a database 116 at the customer service center 115, the revision is automatically downloaded to every data processing system 113 coupled to the customer service center 115 via the network, in a manner that is entirely transparent to the users of the data processing systems. This elimination of manual intervention is particularly advantageous because software updates are often conventionally down by technicians having to go to the physical site of each data processing system 113.

Although described above in connection with software updates in the field, it should be appreciated that this feature of the present invention is also advantageous in a manufacture/test facility to update software on all of the data processing systems under test.

In addition to software updates, in a manufacture/test environment or in the field, there may be minimum revision levels of hardware that are supported for the data processing systems being monitored. In another embodiment of the invention, the database in the customer service center 115 (or an analogous monitoring center in a manufacture/test environment) determines the revision level of every component and subassembly in every system to which it is connected via the network 27. This can be done using the part and serial numbers as described above. When a change is made in the minimum revision level needed for any component or subassembly, the customer service center 115 sends a message to each data processing system 113 that does not meet that revision level, notifying the data processing system that the particular hardware should be updated. This information can then be relayed to a system administrator who can oversee the hardware update. Again, this notification procedure is automatic in that it requires no manual intervention by a system operator.

It should be appreciated that the embodiments of the present invention discussed above relating to the monitoring and automatic updating of systems in the field or a manufacture/test environment are not limited to the architecture shown in FIG. 7. Although specifically described in connection with FIG. 7, it should be appreciated that the automatic updating feature of the present invention can be implemented using any of the configurations discussed above in connection with FIGS. 2–6. When the data processing systems being monitored/updated are conventionally provided with a network interface can be coupled to a network (e.g., if the systems being monitored are PCS or other general purpose computers), that connection can be used to communicate with the APC monitor 25. Alternatively, for applications involving data processing systems that are not conventionally coupled directly to a network, such a connection can be provided in the manner discussed above.

Although the use of a networked connection is advantageous for the reasons discussed above, it should be appreciated that the embodiments of the present invention relating to the automatic software and hardware updates are not limited in this respect. The passing of information between the APC monitor 25 and the monitored systems can alternatively be accomplished in other ways, e.g., via a modem/telephone line connection.

It should be appreciated that the embodiments of the present invention described above provide an improvement over conventional 3-tier client server systems. The embodiments of the invention shown, for example, in FIGS. 2–7 include components of a traditional 3-tier client server system, wherein data flows from the client or first tier (e.g., the systems 21, 23 being monitored) to a server or second tier (e.g., the monitoring system 25), wherein it is processed and then stored in a third tier (e.g., the database 35). A number of embodiments of the present invention add another layer that can be considered as a fourth tier, and which is generically described herein as a process manager. The process manager monitors information that enters the database in the monitor system (e.g., database 35 in FIG. 2), and reacts to it in a number of ways depending upon the nature of the information. Several specific examples of the process manager have been described above. For example, when the heart beat service 37 (FIG. 3) detects that one of the systems in the field or under test is experiencing a problem that prohibits it from communicating over the network, information can be written to the database 35 (FIG. 3), which in turn causes the process manager to e-mail and/or page a system administrator to address the problem. Another example of the process manager is the embodiment of the invention discussed above wherein software updates to the database can result in the process manager broadcasting information to the monitored systems to automatically update the software on those systems. In these situations, the central monitoring system acts more as a client, with the monitored systems acting in a capacity that is generally viewed as that of a server. The process manager or fourth tier provides a closed feedback loop system and bi-directional communication between the monitoring system and the systems being monitored.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of monitoring a plurality of remote data processing systems installed at a plurality of remote customer sites from a local monitoring system disposed at a local customer service site to determine when any of the remote data processing systems experiences a failure, the method comprising steps of:
   (A) coupling the plurality of remote data processing systems to the local monitoring system via a network cloud; and
   (B) when one of the plurality of remote data processing systems experiences a failure, detecting the failure based upon communications over the network cloud between the one of the plurality of remote data processing systems at the remote customer site and the local monitoring system at the customer service site.

2. The method of claim 1, wherein step (B) includes steps, performed by the monitoring system, of:
   periodically transmitting communications over the network cloud to the one of the plurality of data processing systems to determine whether the one of the plurality of data processing systems is capable of returning a responsive communication over the network cloud; and
   when no responsive communication is received from the one of the plurality of data processing systems, determining that the failure has occurred in the one of the data processing systems.

3. The method of claim 2, wherein step (B) includes steps, performed by the one of the data processing systems, of:
   detecting the failure; and
   broadcasting a service request over the network cloud from the one of the plurality of data processing systems to the monitoring system, the service request indicating that the failure has occurred in the one of the plurality of data processing systems.

4. The method of claim 1, further including a step, performed by the monitoring system, of notifying service personnel of the failure in the one of the plurality of data processing systems.

5. The method of claim 1, wherein step (B) includes steps, performed by the one of the data processing systems, of:
   detecting the failure;
   storing information identifying a nature of the failure; and
   broadcasting a service request over the network cloud from the one of the plurality of data processing systems to the monitoring system, the service request indicating that the failure has occurred in the one of the plurality of data processing systems.

6. The method of claim 5, wherein step (B) further includes steps of:
   transmitting, over the network cloud, a response from the monitoring system to the service request indicating that the monitoring system is prepared to process the service request; and
   transmitting, from the one of the plurality of data processing systems to the monitoring system, the stored information indicating the nature of the failure.

7. The method of claim 6, wherein the monitoring system includes a database, and wherein step (B) further includes a step of storing in the database the information indicating the nature of the failure.

8. The method of claim 5, wherein step (B) further includes a step of:
   when a response is received from the monitoring system indicating that the monitoring system is prepared to process the service request, transmitting from the one of the plurality of data processing systems to the monitoring system the stored information indicating the nature of the failure.

9. The method of claim 1, wherein each of the plurality of data processing systems is a storage system that includes a plurality of disc drives.

10. The method of claim 9, wherein each of the plurality of data processing systems has a service processor, and wherein step (A) includes a step of directly coupling the service processor of each of the plurality of data processing systems to the network cloud.

11. The method of claim 1, wherein the monitoring system includes a database, and wherein step (B) further includes a step of storing in the database information indicating the nature of the failure.

12. The method of claim 1, wherein step (B) further includes steps, performed by the monitoring system, of periodically transmitting inquiries over the network cloud to the one of the plurality of data processing systems requesting information as to whether the one of the plurality of data processing systems has experienced a failure.

13. The method of claim 12, wherein step (B) further includes steps, performed by the one of the data processing systems, of:
   detecting the failure;
   storing information indicating the nature of the failure; and responding to the inquiries by transmitting the stored information, indicating the nature of the failure, over the network cloud to the monitoring system.

14. The method of claim 1, wherein step (B) further includes steps, performed by the one of the data processing systems, of:

detecting the failure;

storing information indicating the nature of the failure; and responding to periodic communications from the monitoring system by transmitting to the monitoring system the stored information indicating the nature of the failure.

15. The method of claim 1, wherein each of the plurality of data processing systems has a service processor, and wherein step (A) includes a step of directly coupling the service processor of each of the plurality of data processing systems to the network cloud.

16. The method of claim 1, wherein step (A) includes a step of coupling the plurality of data processing systems to the monitoring system via a network cloud that includes the Internet.

17. The method of claim 16, wherein each of the plurality of data processing systems is a storage system that includes a plurality of disc drives.

18. The method of claim 1, wherein step (B) includes steps, performed by the one of the data processing systems, of:

detecting the failure; and broadcasting a service request over the network cloud from the one of the plurality of data processing systems to the monitoring system, the service request indicating that the failure has occurred in the one of the plurality of data processing systems.

19. A method of monitoring a plurality of data processing systems from a monitoring system to determine when any of the data processing systems experiences a failure, wherein the plurality of data processing systems and the monitoring system each is installed in a manufacture/test facility, the method comprising steps of:

(A) coupling the plurality of data processing systems to the monitoring system via a network cloud;

(B) executing a plurality of tests on each of the plurality of data processing systems to test the functional operation of the plurality of data processing systems, each one of the plurality of tests generating a failure when one of the plurality of data processing systems does not properly execute the one of the plurality of tests; and (C) when one of the plurality of data processing systems experiences a failure, detecting the failure at the monitoring system based upon communications over the network cloud between the one of the plurality of data processing systems and the monitoring system.

20. The method of claim 19, wherein step (B) includes a step of:

when the one of the plurality of data processing systems experiences a failure, transferring information from the one of the plurality of data processing systems to the monitoring system through the network cloud, the information indicating to the monitoring system that the one of the plurality of data processing systems has experienced the failure.

21. The method of claim 19, wherein step (B) includes steps, performed by the one of the data processing systems, of:

detecting the failure; and broadcasting a service request over the network cloud from the one of the plurality of data processing systems to the monitoring system, the service request indicating that the failure has occurred in the one of the plurality of data processing systems.

22. The method of claim 19, wherein each of the plurality of data processing systems has a service processor, and wherein step (A) includes a step of directly coupling the service processor of each of the plurality of data processing systems to the network cloud.

23. The method of claim 19, wherein the monitoring system includes a database, and wherein step (B) further includes a step of storing in the database information indicating the nature of the failures of each of the plurality of data processing systems in the manufacture/test facility.

24. The method of claim 19, wherein step (A) includes a step of coupling the plurality of data processing systems to the monitoring system via a network cloud that includes the Internet.

25. The method of claim 19, wherein step (B) includes steps, performed by the one of the data processing systems, of:

detecting the failure;

storing information identifying a nature of the failure; and broadcasting a service request over the network cloud from the one of the plurality of data processing systems to the monitoring system, the service request indicating that the failure has occurred in the one of the plurality of data processing systems.

26. The method of claim 25, wherein step (B) further includes steps of:

transmitting, over the network cloud, a response from the monitoring system to the service request indicating that the monitoring system is prepared to process the service request; and transmitting, from the one of the plurality of data processing systems to the monitoring system, the stored information indicating the nature of the failure.

27. The method of claim 19, wherein step (B) includes steps, performed by the monitoring system, of:

periodically transmitting communications over the network cloud to the one of the plurality of data processing systems to determine whether the one of the plurality of data processing systems is capable of returning a responsive communication over the network cloud; and when no responsive communication is received from the one of the plurality of data processing systems, determining that the failure has occurred in the one of the data processing systems.

28. The method of claim 27, wherein step (B) includes steps, performed by the one of the data processing systems, of:

detecting the failure; and broadcasting a service request over the network cloud from the one of the plurality of data processing systems to the monitoring system, the service request indicating that the failure has occurred in the one of the plurality of data processing systems.

29. The method of claim 19, wherein step (B) further includes steps, performed by the monitoring system, of periodically transmitting inquiries over the network cloud to the one of the plurality of data processing systems requesting information as to whether the one of the plurality of data processing systems has experienced a failure.

30. The method of claim 29, wherein step (B) further includes steps, performed by the one of the data processing systems, of:

detecting the failure;

storing information indicating the nature of the failure; and responding to the inquiries by transmitting the stored information, indicating the nature of the failure, over the network cloud to the monitoring system.

31. The method of claim 19, wherein each of the plurality of data processing systems is a storage system that includes a plurality of disc drives.

32. The method of claim 31, wherein each of the plurality of data processing systems has a service processor, and wherein step (A) includes a step of directly coupling the service processor of each of the plurality of data processing systems to the network cloud.

33. An apparatus, comprising:

a network cloud;

a plurality of remote data processing systems installed at a plurality of remote customer sites and coupled to the network cloud; and a local monitoring system disposed at a local customer service site and coupled to the network cloud, wherein the local monitoring system monitors the plurality of remote data processing systems to determine when any of the remote data processing systems experiences a failure, and wherein the local monitoring system detects a failure in one of the remote data processing systems based upon communications over the network cloud between the one of the plurality of remote data processing systems and the local monitoring system.

34. The apparatus of claim 33, wherein each one of the data processing systems includes:

means for detecting a failure in the one of the data processing systems; and means for, when a failure is detected, broadcasting a service request over the network cloud to the monitoring system indicating that the failure has occurred.

35. The apparatus of claim 34, wherein the monitoring system includes a plurality of servers capable of responding to each service request broadcast over the network by one of the plurality of data processing systems.

36. The apparatus of claim 34, wherein each of the data processing systems broadcasts a different type of service request for different types of failures, and wherein the monitoring system includes a plurality of servers capable of responding to each type of service request broadcast over the network by one of the plurality of data processing systems.

37. The apparatus of claim 36, wherein the apparatus includes means for selecting a one of the plurality of servers capable of responding to each type of service request most efficiently.

38. The apparatus of claim 33, wherein the monitoring system includes:

means for periodically transmitting communications over the network cloud to each of the plurality of data processing systems to determine whether each of the plurality of data processing systems is capable of returning a responsive communication over the network cloud; and means for determining that the failure has occurred in one of the data processing systems when no responsive communication is received from the one of the plurality of data processing systems.

39. The apparatus of claim 38, wherein each one of the data processing systems includes:

means for detecting a failure in the one of the data processing systems; and means for, when a failure is detected, broadcasting a service request over the network cloud to the monitoring system indicating that the failure has occurred.

40. The apparatus of claim 33, wherein the monitoring system includes means for notifying service personnel when a failure is detected in one of the plurality of data processing systems.

41. The apparatus of claim 33, wherein each of the plurality of data processing systems has a service processor directly coupled to the network cloud.

42. The apparatus of claim 41, wherein the monitoring system includes a database and means for storing in the database the information indicating the nature of each failure.

43. The apparatus of claim 33, wherein the monitoring system includes a database and means for storing in the database information indicating the nature of each failure.

44. The apparatus of claim 33, wherein the monitoring system further includes polling means for periodically transmitting inquiries over the network cloud to each one of the plurality of data processing systems requesting information as to whether the one of the plurality of data processing systems has experienced a failure.

45. The apparatus of claim 44, wherein each one of the data processing systems includes:

means for detecting a failure in the one of the data processing systems;

means for storing information indicating the nature of each failure; and means, responsive to the inquiries, for transmitting the stored information that indicates the nature of the failure over the network cloud to the monitoring system.

46. The apparatus of claim 33, wherein the network cloud includes the Internet.

47. The apparatus of claim 46, wherein each of the plurality of data processing systems is a storage system that includes a plurality of disc drives.

48. The apparatus of claim 33, wherein each one of the data processing systems includes:

means for detecting a failure in the one of the data processing systems;

means for storing information identifying a nature of each failure; and means for, when a failure is detected, broadcasting a service request over the network cloud to the monitoring system indicating that the failure has occurred.

49. The apparatus of claim 48, wherein each of the plurality of data processing systems includes means for, when a response is received from the monitoring system indicating that the monitoring system is prepared to process the service request, transmitting from the one of the plurality of data processing systems to the monitoring system the stored information indicating the nature of the failure.

50. The apparatus of claim 33, wherein each of the plurality of data processing systems is a storage system that includes a plurality of disc drives.

51. The apparatus of claim 50, wherein each of the plurality of data processing systems has a service processor directly coupled to the network cloud.

52. An apparatus comprising:

a network cloud;

a plurality of data processing systems installed in a manufacture/test facility coupled to the network cloud, each one of the plurality of data processing systems executing a plurality of tests to test the functional operation of the one of the plurality of data processing systems, each one of the plurality of tests generating a failure when the one of the plurality of data processing systems does not properly execute the one of the plurality of tests; and a monitoring system, coupled to the network cloud, to monitor the plurality of data processing systems to determine when any of the data processing systems experiences a failure, wherein the monitoring system detects a failure in one of the data processing systems based upon communications over the network cloud between the one of the plurality of data processing systems and the monitoring system.

53. The apparatus of claim 52, further including means for, when one of the plurality of data processing systems experiences a failure, transferring information from the one of the plurality of data processing systems to the monitoring system through the network cloud, the information indicating to the monitoring system that the one of the plurality of data processing systems has experienced the failure.

54. The apparatus of claim 52, wherein each of the plurality of data processing systems has a service processor directly coupled to the network cloud.

55. The apparatus of claim 52, wherein each one of the data processing systems includes:

means for detecting a failure in the one of the data processing systems;

means for storing information identifying a nature of each failure; and means for, when a failure is detected, broadcasting a service request over the network cloud to the monitoring system indicating that the failure has occurred.

56. The apparatus of claim 55, wherein each of the plurality of data processing systems includes means for, when a response is received from the monitoring system indicating that the monitoring system is prepared to process the service request, transmitting from the one of the plurality of data processing systems to the monitoring system the stored information indicating the nature of the failure.

57. The apparatus of claim 52, wherein the monitoring system includes a database, and wherein the apparatus further includes means for storing in the database information indicating the nature of the failures of each of the plurality of data processing systems in the manufacture/test facility.

58. The apparatus of claim 52, wherein each of the plurality of data processing systems is a storage system that includes a plurality of disc drives.

59. The apparatus of claim 58, wherein each of plurality of data processing systems has a service processor directly coupled to the network cloud.

60. The apparatus of claim 52, wherein the network cloud includes the Internet.

61. The apparatus of claim 52, wherein the monitoring system includes:

means for periodically transmitting communications over the network cloud to each of the plurality of data processing systems to determine whether each of the plurality of data processing systems is capable of returning a responsive communication over the network cloud; and means for determining that the failure has occurred in one of the data processing systems when no responsive communication is received from the one of the plurality of data processing systems.

62. The apparatus of claim 61, wherein each one of the data processing systems includes:

means for detecting a failure in the one of the data processing systems; and means for, when a failure is detected, broadcasting a service request over the network cloud to the monitoring system indicating that the failure has occurred.

63. The apparatus of claim 52, wherein each one of the data processing systems includes:

means for detecting a failure in the one of the data processing systems; and means for, when a failure is detected, broadcasting a service request over the network cloud to the monitoring system indicating that the failure has occurred.

64. The apparatus of claim 52, wherein the monitoring system further includes polling means for periodically transmitting inquiries over the network cloud to each one of the plurality of data processing systems requesting information as to whether the one of the plurality of data processing systems has experienced a failure.

65. The apparatus of claim 64, wherein each one of the data processing systems includes:

means for detecting a failure in the one of the data processing systems;

means for storing information indicating the nature of each failure; and means, responsive to the inquiries, for transmitting the stored information that indicates the nature of the failure over the network cloud to the monitoring system.

66. A method of automatically downloading an updated a piece of software to a plurality of data processing systems, the plurality of data processing systems each being coupled to a service center, the method comprising steps of:

(A) providing the updated piece of software on the service center;

(B) periodically receiving service requests from each of the plurality of data processing systems, each service request including information from which a determination can be made as to whether the data processing system that transmitted the request has a copy of the updated piece of software;

(C) in response to the service requests, automatically determining which of the plurality of data processing systems do not have a copy of the updated piece of software; and (D) automatically downloading a copy of the updated piece of software to the data processing systems that do not have a copy of the updated piece of software.

67. The method of claim 66, wherein the plurality of data processing systems is coupled to the service center via a network cloud, and wherein step (D) includes a step of automatically downloading a copy of the updated piece of software over the network cloud.

68. The method of claim 66, wherein steps (B)–(D) execute automatically, without any operator participation.

69. A method of using a monitoring system to monitor the status of a plurality of data processing systems in a manufacture/test facility, the method comprising steps of:

(A) executing a plurality of tests on each of the plurality of data processing systems to test the functional operation of the plurality of data processing systems, each one of the plurality of tests generating a failure when one of the plurality of data processing systems does not properly execute the one of the plurality of tests;

(B) when a failing one of the plurality of data processing systems experiences a failure;

storing information in the failing one of the plurality of data processing systems identifying a nature of the failure; and broadcasting a service request from the failing one of the plurality of data processing systems to the monitoring system, the service request indicating that the failure has occurred; and (C) storing information in the monitoring system to record the failure in response to information provided by the failing one of the plurality of data processing systems.

70. The method of claim 69, wherein step (C) further includes steps of:

tranmsitting a response from the monitoring system to the service request indicating that the monitoring system is prepared to process the service request;

receiving, from the failing one of the plurality of data processing systems, the stored information indicating the nature of the failure; and storing information in the monitoring system to record the failure based upon the stored information indicating the nature of the failure.

71. The method of claim 70, further including steps, performed by the monitoring system, of:

periodically transmitting communications to each of plurality of data processing systems to determine whether each of the plurality of data processing systems is capable of returning a responsive communication over the network cloud; and when no responsive communication is received from one of the plurality of data processing systems, determining that a failure has occurred in the one of the data processing systems.

72. A method of using a monitoring system to monitor the status of a plurality of data processing systems in a manufacture/test facility, the method comprising steps of:

(A) executing a plurality of tests on each of the plurality of data processing systems to test the functional operation of the plurality of data processing systems, each one of the plurality of tests generating a failure when one of the plurality of data processing systems does not properly execute the one of the plurality of tests;

(B) periodically transmitting inquiries from the monitoring system to each of the plurality of data processing systems requesting information as to whether the one of the plurality of data processing systems has experienced a failure; and (C) when a failing one of the plurality of data processing systems experiences a failure;

storing information in the failing one of the plurality of data processing systems identifying a nature of the failure; and responding to one of the periodic inquiries by transmitting the stored information that indicates the nature of the failure to the monitoring system.

73. A method of monitoring a plurality of data processing systems from a monitoring system to determine when any of the data processing systems experiences a failure, the method comprising steps of:

(A) coupling the plurality of data processing systems to the monitoring system via a network cloud; and (B) when one of the plurality of data processing systems experiences a failure, detecting the failure at the monitoring system based upon communications over the network cloud between the one of the plurality of data processing systems and the monitoring system, wherein step (B) further includes steps of:

(B1) detecting the failure at the one of the data processing systems, and broadcasting a service request over the network cloud from the one of the plurality of data processing systems to the monitoring system, the service request indicating that the failure has occurred in the one of the plurality of data processing systems; and (B2) periodically transmitting communications over the network cloud from the monitoring system to the one of the plurality of data processing systems to determine whether the one of the plurality of data processing systems is capable of returning a responsive communication over the network cloud, and when no responsive communication is received from the one of the plurality of data processing systems, determining that the failure has occurred in the one of the data processing systems.

* * * * *